United States Patent
Chang et al.

(10) Patent No.: US 8,546,514 B2
(45) Date of Patent: Oct. 1, 2013

(54) CONTINUOUS PROCESS FOR MANUFACTURING ALIPHATIC POLYCARBONATES FROM CARBON DIOXIDE AND EPOXIDES

(75) Inventors: Byoungmu Chang, Daejeon (KR); Gwangbin Moon, Daejeon (KR); Myungahn Ok, Daejeon (KR); Jisu Jeong, Daejeon (KR); Jieun Yoo, Daejeon (KR); Sun Choi, Daejeon (KR); Hongdae Kim, Seoul (KR); Sujith Sudevan, Daejeon (KR); Daeho Shin, Daejeon (KR); Jaeho Lee, Daejeon (KR); Seongjun Lee, Daejeon (KR); Gyungrok Kim, Daejeon (KR); Mingyoo Park, Ulsan (KR); Jangjae Lee, Seongnam-si (KR)

(73) Assignee: SK Innovation Co., Ltd., Seoul (KR)

( * ) Notice: Subject to any disclaimer, the term of this patent is extended or adjusted under 35 U.S.C. 154(b) by 293 days.

(21) Appl. No.: 12/874,507

(22) Filed: Sep. 2, 2010

(65) Prior Publication Data
US 2011/0054145 A1   Mar. 3, 2011

(30) Foreign Application Priority Data
Sep. 3, 2009   (KR) .................. 10-2009-0083012

(51) Int. Cl.
*C07C 69/96* (2006.01)

(52) U.S. Cl.
USPC ........... 528/277; 588/260; 568/905; 528/395; 528/405

(58) Field of Classification Search
USPC .............. 588/277, 260; 568/905; 528/395, 528/405
See application file for complete search history.

(56) References Cited

U.S. PATENT DOCUMENTS

| | | | |
|---|---|---|---|
| 2003/0045739 A1* | 3/2003 | Buchanan et al. | 558/277 |
| 2010/0121026 A1* | 5/2010 | Lee et al. | 528/405 |

FOREIGN PATENT DOCUMENTS

KR   1020090090154 A   8/2009

OTHER PUBLICATIONS

Na et al. Inorganic Chemistry, 2009, 48, 10455-10465.*
van Schilt, "Carbon Dioxide as a Comonomer for the Production of Aliphatic Polycarbonates; Thermodynamics, Catalysis and Process Design", Dec. 19, 2006, pp. i-48, Universiteitsdrukkerij Technische Universiteit Eindhoven, Eindhoven, The Netherlands.

* cited by examiner

Primary Examiner — Shane Fang
(74) Attorney, Agent, or Firm — The Webb Law Firm

(57) ABSTRACT

Disclosed is a continuous process for manufacturing aliphatic polycarbonate by polymerizing carbon dioxide and one or more epoxide compound in the presence of catalyst, in which carbon dioxide, one or more epoxide compound, and the catalyst are continuously supplied to polymerization reactor to produce aliphatic polycarbonate, separate unreacted carbon dioxide and epoxide compound and recycle them as raw materials.

17 Claims, 3 Drawing Sheets

CONTINUOUS PROCESS FOR MANUFACTURING ALIPHATIC POLYCARBONATES FROM CARBON DIOXIDE AND EPOXIDES

TECHNICAL FIELD

The present invention relates to a continuous process for manufacturing aliphatic polycarbonate from carbon dioxide and epoxide compound, and more specifically, to a continuous process, which includes catalytic-polymerizing for manufacturing aliphatic polycarbonate from carbon dioxide and epoxide, separating polymer from reaction solvent and unreacted monomers, and recycling of unreacted monomers.

BACKGROUND ART

Carbon dioxide is one of the useful chemicals, because it is nontoxic, nonflammable and abundant in nature. On the other hand, carbon dioxide is notorious for a major cause of air pollution and global warming, which explains that reducing its emittance is becoming nowadays a justifiable action for sustainable development.

Generally, the conversion technology from carbon dioxide as a reactant to produce aliphatic polycarbonate with high value utilizes catalyst containing metal center, ligand, and active anion. In the presence of catalyst, carbon dioxide and epoxide are alternatively bounded to each other and these monomers form a repeating unit, and then this unit grows into a polymer.
A major reaction pathway toward aliphatic polycarbonate is as follow:

[Reaction Formula]

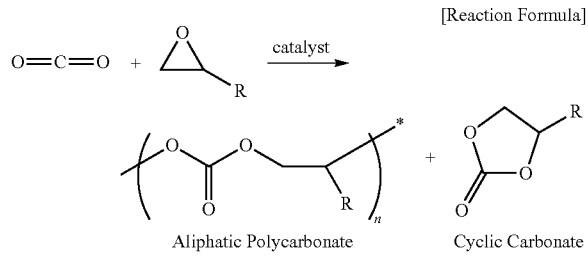

Aliphatic Polycarbonate     Cyclic Carbonate

Aliphatic polycarbonate has excellent transparency, good barrier properties against water and oxygen, printability, etc. It does not generate smoke when burning, which means it can be applicable to nontoxic materials.

Many research groups have tried to develop this catalytic conversion technology enabling alternating copolymerization of carbon dioxide and epoxide, however, it was not easy to attain e commercial feasibilities due to low selectivity, low polymer yield and excessively long reaction time. In other words, there has not been any continuous process introduced to produce aliphatic polycarbonate in large quantity.

Up to now, polycarbonate that is industrially used is aromatic polycarbonate, coming from bisphenol A and phosgene which are both toxic to human body. Therefore, aliphatic polycarbonate has high environment-friendly values because it does not only use toxic materials but also it reduces or consumes carbon dioxide, in which its emitting level should be reduced.

The present invention relates to a continuous process of aliphatic polycarbonate polymerization in large amount from carbon dioxide with epoxide compound.

DISCLOSURE

Technical Problem

The first objective of this present invention is to provide a continuous process of aliphatic polycarbonate polymerization from carbon dioxide and epoxide compound, which is reaction solvent and reaction material in the presence of catalyst.

The second objective of this present invention is to provide a continuous process of separating polymers from unreacted monomers and recycling these unreacted monomers into the polymerization process.

Technical Solution

The present invention provides a continuous process for manufacturing aliphatic polycarbonate, which includes 1) feeding carbon dioxide, one or more epoxides and organometallic catalyst, 2) polymerizing these monomers and finally 3) separating and recycling untreated monomers.

The epoxide compound can be used as a reaction solvent and a reactant at the same time.

In addition, if necessary, almost every polar solvent can be used as reaction solvent in addition to the epoxide compound, because aliphatic polycarbonates are soluble in almost every polar solvent. Specifically, for example acetone, methyl ethyl ketone, ethyl acetate, dichloromethane, chloroform, methylacetate, acetonitrile, tetrahydrorfuran, dioxane, etc can be reaction solvent. However, it is not limited thereto.

In addition, according to the present invention, the polymer solution is supplied to catalyst separator to eliminate the catalyst. Ion exchange method is applied in catalyst separator.

In addition, according to the present invention, prepolymerization is available prior to feeding monomers into polymerization reactor. Preferably, prepolymerization can be done at 10~49 kg/cm$^2$g and 0~100° C. and the polymerization at 10~49 kg/cm$^2$g and 40~100° C.

Apart of the epoxide compound according to the present invention is supplied to the polymerization reactor outlet to adjust the concentration of polymer to be 5~30 wt %.

According to the present invention, the unreacted carbon dioxide and the epoxide compound are separated from polymer via several phase separators where the unreacted epoxide compound with carbon dioxide are vaporized, and there remains polymer melt. The operating conditions of phase separators are 0~10 kg/cm$^2$,g and 40~200° C. for intermediate pressure separator and 0~5 kg/cm$^2$,g and 40~200° C. for low pressure separator. The vapors then are introduced to recycling process, which includes distillation columns to separate carbon dioxide and epoxide compound respectively and to recycle them as raw material.

According to the present invention, carbon dioxide is mixed with epoxide compound, and the combined feed is maintained in full liquid phase, and then supplied to the prepolymerization reactor or the polymerization reactor. The organometallic catalyst is also maintained in liquid phase with the mole ration of solvent to catalyst ranging 10,000:1 to 200,000:1. Its solvent can be epoxide or other solvents such as acetone, propylene carbonate, ethylene carbonate, dichloromethane, chloroform, methyl acetate, ethyl acetate, aceonitrile, tetrahydrofurane, dioxane, and etc.

According to the present invention, the epoxide compound fed to the reactor can be one or more from the group consisting of substituted or unsubstituted (C2-C10) alkylene oxide with a halogen or an alkoxy; substituted or unsubstituted (C4-C20) cycloalkylene oxide with a halogen or an alkoxy;

and substituted or unsubstituted (C8-C20) styrene oxide with a halogen, an alkoxy, an alkyl, or an aryl.

The catalyst according to the present invention may use a complex represented by the following Chemical Formula 1:

[L¹L²L³L⁴M]⁻[X¹...H...X²]⁻ₐZ⁻_b    [Chemical Formula 1]

[where,

M is a cobalt III or a chrome III;

$L^1$ to $L^4$ is an anionic X-type ligand, $L^1$ to $L^4$ may be independently same or different to each other, and may be connected each other to be a bidentate, a tridentate, or a tetradentate ligand, one or more of $L^1$ to $L^4$ include a quaternary ammonium cation, the total number of ammonium cations included in $L^1$ to $L^4$ is 1+a+b, and a complex compound is overall neutral;

A or b is an integer; and

Ligand without the ligand including the quaternay ammonium cation of $L^1$ to $L^4$, or $X^1$ and $X^2$ is independently a halogen anion or $HCO_3^-$, C1 to C20 carboxy anion, C6 to C20 aryloxy anion with or without one or more of a halogen atom, a nitrogen atom, an oxygen atom, a silicon atom, a sulfur atom, and a phosphorus atom; C1 to C20 alkoxy anion; C1 to C20 carbonate anion; C1 to C20 alkylsulfonate anion; C1 to C20 amide anion; C1 to C20 carbamate anion, and Z is $BF_4^-$, $ClO_4^-$, $NO_3^-$ or $PF_6^-$]

Specifically, the catalyst may use one selected from the following Chemical Formula 2 to Chemical Formula 8:

[Chemical Formula 2]

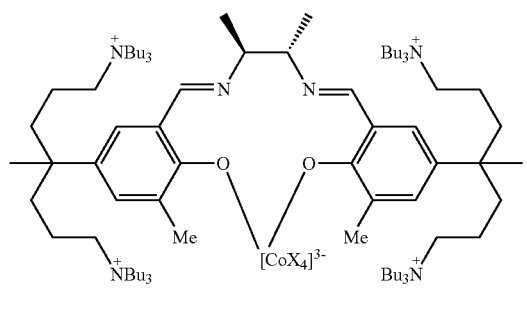

X = 2,4-dinitrophenolate

[Chemical Formula 3]

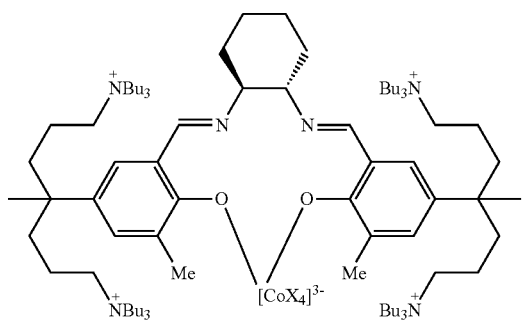

[Chemical Formula 4]

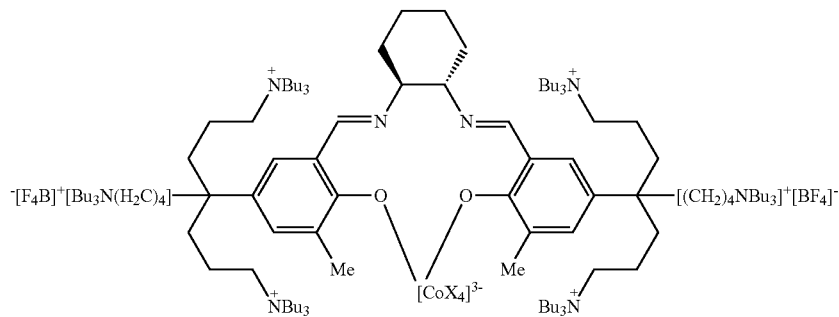

X = 2,4-dinitrophenolate

[Chemical Formula 5]

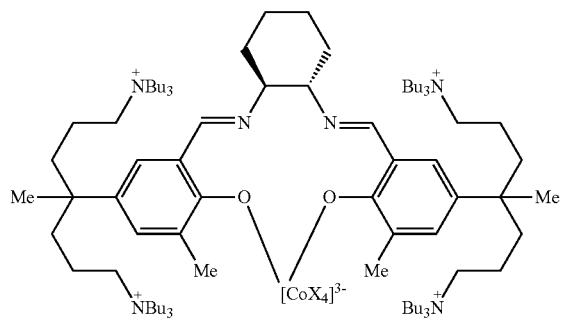

X = 2,4-dinitrophenolate

[Chemical Formula 6]

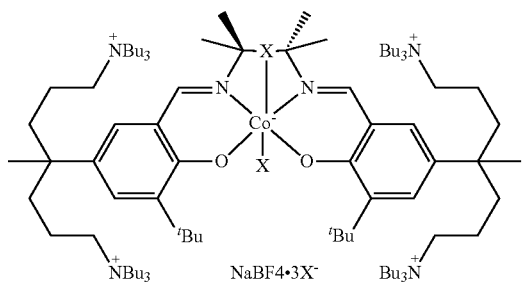

[Chemical Formula 7]

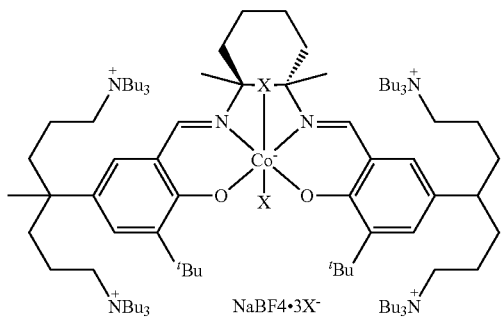

X = 2,4-dinitrophenolate

[Chemical Formula 8]

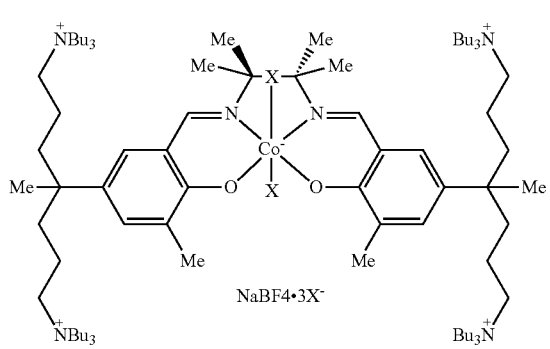

The present invention will be described in more detail with reference to the following drawings.

FIG. 1 is a schematic diagram of the process illustrating a process for manufacturing an aliphatic polycarbonate according to the present invention as a first embodiment.

As shown in FIG. 1, the first embodiment according to the present invention includes:

a) continuously supplying carbon dioxide 1, one or more epoxide compound 2, and organometallic metal catalyst 3 to polymerization reactor 200;

b) supplying polymer solution 5 which is polymerized in step a) to a catalyst separator 300 for catalyst adsorption; and c) supplying polymer solution 6 of which catalyst is removed to several phase separators 400 to separate unreacted epoxide compound and carbon dioxide into top stream 8 and yield polymer melt 7.

FIG. 2 is a schematic diagram of the process illustrating a process for manufacturing the aliphatic polycarbonate according to the present invention as a second embodiment.

As shown in FIG. 2, the second embodiment according to the present invention includes:

a) continuously supplying carbon dioxide 1, one or more epoxide compound 2, and organometallic catalyst 3 to polymerization reactor 200;

b) supplying polymer solution 5 which is polymerized in step a) to catalyst separator 300 for catalyst adsorption;

c) supplying polymer solution 6 of which catalyst is removed to several phase separators 400 to separate unreacted epoxide compound and carbon dioxide into top stream 8 and yield polymer melt 7; and d) supplying top stream 8 from phase separators 400 to distillation column 500 to separate carbon dioxide 9 and epoxide compound 10 and then reusing them as the raw material.

FIG. 3 is another schematic diagram of the process illustrating a process for manufacturing the aliphatic polycarbonate according to the present invention as a third embodiment.

As shown in FIG. 3, the third embodiment according to the present invention includes:

a) continuously supplying prepolymerized solution 4 to polymerization reactor 200 after continuously supplying carbon oxide 1, one or more epoxide compound 2, and organometallic catalyst to prepolymerization reactor 100;

b) supplying polymer solution 5 which is polymerized in the step a) to catalyst separator 300 for catalyst adsorption;

c) supplying polymer solution 6 of which catalyst is removed to several phase separators 400 to separate unreacted epoxide compound and carbon dioxide into top stream 8 and yield polymer melt 7; and d) supplying top stream 8 from phase separators 400 to distillation columns 500 to separate carbon dioxide 9 and epoxide compound 10 and then reusing them as raw material.

FIG. 4 is another schematic diagram of the process illustrating a process for manufacturing the aliphatic polycarbonate according to the present invention as a fourth embodiment.

As shown in FIG. 4, the fourth embodiment according to the present invention includes:

a) continuously supplying carbon dioxide 1, one or more epoxide compound 2, and organometallic catalyst 3 to polymerization reactor 200;

b) supplying polymer solution 5 which is polymerized in the step a) to catalyst separator 300 for catalyst adsorption;

c) supplying polymer solution 6 of which catalyst is removed to phase separators 400 to separate unreacted epoxide compound and carbon dioxide into top stream 8 and yield polymer melt 7; and d) supplying top stream 8 from phase separators 400 to distillation columns 500 to separate carbon dioxide 9 and epoxide compound 10 and then reusing them as raw material;

wherein, a part of the epoxide compound 13 in the step a) is supplied to the polymerization reactor outlet to adjust 5~30 wt % of the polymer concentration in the polymer solution 5.

In the present invention, the step of supplying raw materials will be described in more detail. Carbon dioxide, epoxide compound, and organometallic catalyst are used as raw materials.

In the present invention, liquid-phase carbon dioxide is stored in a pressurized liquid state at pressure of 10~30 kg/cm$^2$g, more preferably 18~22 kg/cm$^2$g. It is vaporized through a vaporizer (not shown), and then supplied to carbon dioxide purifier (not shown). Since moisture in carbon dioxide is able to significantly reduce the catalyst activity, it is removed through the purifier, and the purified carbon dioxide is pressurized at approximately 20~60 kg/cm$^2$g, more preferably 25~45 kg/cm$^2$g by a compressor and then is mixed with the epoxide compound as a solvent. Preferably, the epoxide compound and carbon dioxide are perfectly mixed into in a homogeneous solution phase through an inline mixer (not shown) or a line loop.

The epoxide compound according to the present invention is used as reaction solvent and reacting monomer and its excess amount is recycled through solvent recovery process and finally returned to epoxide purifier. Moisture in epoxide compound 2 is also able to reduce the catalyst activity used in the polymerization, thus it should be removed through the purifier (not shown), prior to feeding to polymerization reactor 200. Additional make-up epoxide compounds are fed to compensates the amount used in the polymerization and the amount discharged as a waste. The fresh epoxide compound 2 is stored in the storage tank (not shown). In case of propylene oxide, the boiling point is as low as 35° C. at an atmospheric pressure, so it should be pressurized at 0~10 kg/cm$^2$g, more preferably 5~6 kg/cm$^2$g and chilled at 5~15° C., more preferably 9~10° C.

Since only small amount of aldehyde impurities in epoxide compound is able to significantly reduce the catalyst activity, it is necessary to limit aldehyde content less than several ppm. The aldehyde impurities can be removed by converting them into acetal forms with alcohol, hemiacetal forms with water, alcohols with Grignard reagent, cyanohydrins forms with hydrogen cyanide, or imine forms with amine. In addition, the aldehyde impurities can be removed through a distillation column with high reflux ratio and lots of trays. Preferably, aldehyde in epoxide is removed by introducing amine to the epoxide manufacturing process beforehand.

The epoxide compound in which moisture is removed is stored in an intermediate surge drum, and is pressurized at 20~50 kg/cm$^2$g, more preferably 25~45 kg/cm$^2$g through charge pump At this time, a part of the epoxide compound 13 is supplied to the polymerization reactor outlet, in order to control the concentration of the polymer solution 5 to 5~30 wt %, more preferably 10~13 wt %. Small amount of the epoxide compound can be used for dissolving catalyst.

In addition, if necessary, a reaction solvent other than epoxide can be used. Almost every polar solvent can be used as reaction solvent, because aliphatic polycarbonates are soluble in almost every polar solvent. Specifically, for example, acetone, methyl ethyl ketone, ethyl acetate, dichloromethane, chloroform, methylacetate, acetonitrile, tetrahydrofuran, dioxane, etc. can be used as reaction solvent. However, it is not limited thereto.

In the present invention, the epoxide compound 2 is one or more from the group consisting of substituted or unsubstituted (C2-C10) an alkylene oxide with a halogen or an alkoxy; substituted or unsubstituted (C4-C20) a cycloalkylene oxide with a halogen or an alkoxy; and substituted or unsubstituted (C8-C20) a styrene oxide with a halogen, an alkoxy, an alkyl, or an aryl. When using two or more epoxide compounds, they need to be supplied from each storage tank. For example, propylene oxide, or a mixture of propylene oxide and cyclohexene oxide is used as epoxide compound. At this time, cyclohexane oxide is preferably used when it is required to increase the glass transition temperature ($T_g$) of polymer, and its ratio to propylene oxide should be maintained. The mixing ratio is preferably 10:90~90:10 molar ratio of propylene oxide:cyclohexene oxide according to the targeted glass transition temperature. In the present invention, the organometallic catalyst is dissolved in epoxide compound or other polar solvents such as acetone, propylene carbonate, ethylene carbonate, dichloromethane, chloroform, methyl acetate, ethyl acetate, aceonitrile, tetrahydrofurane, dioxane, and etc. At this time, the solvent ratio to the catalyst is preferably 10,000:1~200,000:1 molar ratio. In addition, the catalyst solution injection amount is preferably ranges of 0.1~5 wt % based on the total amount of epoxide compound and carbon dioxide.

The present invention is not limited to the above-mentioned organic metal catalyst, but the complex compound represented by the following Chemical Formula 1 may be used:

$$[L^1L^2L^3L^4M]^+[X^1\ldots H\ldots X^2]^-_aZ^-_b$$

[where,

M is a cobalt III or a chrome III;

$L^1$ to $L^4$ is an anionic X-type ligand, $L^1$ to $L^4$ may be independently same or different to each other, and may be a bidentate, a tridentate, or a tetradentate ligand by connecting to each other, one or more of $L^1$ to $L^4$ include a quaternary ammonium cation, the number of total ammonium cations included in $L^1$ to $L^4$ is 1+a+b, and complex compound is generally neutral;

a or b is an integer; and a ligand without the ligand including the quaternay ammonium cation of $L^1$ to $L^4$, or $X^1$ and $X^2$ are independently halogen anion or $HCO_3^-$, C1 to C20 carboxy anion, C6 to C20 aryloxy anion with or without one or more of a halogen atom, a nitrogen atom, an oxygen atom, a silicon atom, a sulfur atom, and a phosphorus atom; C1 to C20 alkoxy anion; C1 to C20 carbonate anion; C1 to C20 alkylsulfonate anion; C1 to C20 amide anion; and C1 to C20 carbamate anion, and Z is $BF_4^-$, $ClO_4^-$, $NO_3^-$ or $PF_6^-$]

Hereinafter, the process for manufacturing according to the present invention will be described in more detail.

The present invention is largely divided into reaction section, phase separation section and solvent recovery section.

The reaction section is largely divided into two steps. Firstly, carbon dioxide 1, epoxide compound 2, and catalyst solution 3 are supplied to the prepolymerization reactor 100. The prepolymerization reactor 100 is to provide induction time for maximizing the catalyst activity prior to polymerization and it is preferably operated in a continuous stirred tank reactor (CSTR) at 10~49 kg/cm$^2$g that is similar to that of the polymerization reactor and 0~100° C.

The prepolymerized solution 4 is preferably preheated up to the reaction temperature of the polymerization reactor 200 through a heat exchanger (not shown).

However, if necessary, prepolymerization in the present invention can be skipped and polymerization can be performed only.

The polymerization reactor 200 in the present invention can use not only one, but also several continuous stirred tank reactors connected in series. Prepolymerized solution 4 or carbon dioxide 1, epoxide compound 2 and catalyst solution 3, can be fed into the top of the polymerization reactor and then flowed in down-flow direction, or supplied to the bottom of the polymerization reactor and then flowed in up-flow direction, whichever is chosen, the materials in the polymerization reactor is maintained in full-liquid phase.

The polymerization reactor 200 is preferably operated at 0~100 kg/cm$^2$g, more preferably 10~49 kg/cm$^2$g and 20~120° C., more preferably 40~100° C. The catalyst contained in the polymer solution 5 after finishing the reaction is removed by passing through the catalyst separator 300. If the catalyst is not removed, excess polymerization will alter the polymer properties and cause process trouble such as line plugging. Also if, residual catalyst is remained in polymer solution 5 due to incomplete catalyst removal, it may cause polymer degradation. The catalyst separation is performed via ion exchange. The process of the ion exchange is specifically described in Korean Patent Application No. 10-2008-15454 filed by applicant of the present invention. More specifically, polymer solution 5 is filtered after adding an inorganic material in solid phase that is not dissolved in the polymer solution 5 containing copolymer and catalyst, or the polymer solution is passed through a fixed bed packed with inorganic materials. When contacting with the above packed materials, catalyst forms a complex structure and is attached on them and finally the polymer solution only comes out of the catalyst separator.

The inorganic materials that is not dissolved in the polymer solution is silica or alumina whose surface is reformed or not, preferably silica.

When epoxide compound and carbon dioxide is copolymerized by using the complex compounds represented by the above Chemical Formula 1~7 as the catalyst, the polymerization mechanism is generally known that the polymerization is started by nucleophile attacking the epoxide activated by coordinating an anion of onium salt in central metal having lewis acid group. An alkoxy anion produced by the nucleophile attacking is reacted with the carbon dioxide to be a carbonate anion, the anion is again coordinated in the central metal, the activated epoxide is attacked by nucleophile, and then the carbonate anion is produced. The above-mentioned reaction is repeated to produce a polymer chain. At this time, after polymerizing, at least part of the anion of onium salt contained in the catalyst is converted into the carbonate anion or an alkoxide anion containing the polymer chain. After polymerizing, when removing the carbon dioxide, the carbonate anion is converted into the alkoxide anion.

After polymerizing, the solution dissolving the catalyst and the copolymer is contacted with "the polymer material having a functional group that can be possible to occur a deprotonation by the alkoxy anion", so that "the functional group that can be possible to occur the deprotonation" of the polymer material is acid-base reacted with the alkoxide anion containing the polymer chain that is presented as the anion of onium salt. At this time, the polymer chain receives a proton, thereby neutralizing, and then is dissolved in the solution. And, the catalyst containing the polymer material and the onium salt forms a complex. The complex can be separated by filtering from the copolymer because the complex has not solubility.

Next, the phase separation is for separating the unreacted carbon dioxide and excess epoxide compound in the polymer solution from the aliphatic polycarbonate product. The polymer solution 6 of which the catalyst is removed is fed into several phase separators 400, and then the excess epoxide compound and unreacted carbon dioxide in vapor phase are separated into the top stream 8, and the polymer melt 7 comes out of the bottom Stream.

The configuration for the phase separators 400 is specifically shown in FIG. 5. The phase separator 400 includes an intermediate pressure separator 410, a low-pressure separator 420, a vacuum stripper 430, and a water bath roller 440.

The intermediate pressure separator 410 is operated at 0~10 kg/cm$^2$g, and 40~200° C. Approximately 30~80% of the epoxide compound and the unreacted carbon dioxide in the polymer solution e 6 are removed through the top stream 402, and this stream 402 is supplied to the separation columns 500 via a condenser. The content of epoxide compound in the polymer solution 401 discharged to the bottom of the intermediate pressure separator 410 is approximately 20~70 wt % and is transferred to the low-pressure separator 420.

The low pressure separator 420 is operated at 0~5 kg/cm$^2$g, and 40~200° C. At least 90% of epoxide compound and unreacted carbon dioxide in the polymer solution 401 are separated into the top stream 403. The top stream 403 is also supplied to the separation column 500 via the condenser.

polymer melt 404 is continuously supplied to the vacuum stripper 430 by gear pump installed in the bottom of the low-pressure separator 420.

The vacuum stripper 430 controls the solvent content in the polymer melt 404 coming from the bottom of the low-pressure separator 420. The pressure of the vacuum stripper is maintained at 5~100 torr by using vacuum pump.

The polymer melt 404 falls from the top of the vacuum stripper 430 with constant thickness while passing a distributor (not shown). A small amount of epoxide in the strand is vaporized to the top (O/H), and the content of the epoxide compound in the polymer melt 405 is decreased under 100 ppm. The melt solution of the aliphatic polycarbonate passing through the vacuum stripper is transferred into the extruder 440 by gear pump.

Nitrogen ($N_2$) with high temperature may be injected to the vacuum separator 430 in order to increase efficiency of stripping vapor epoxide.

Next, the solvent recovery section is where the top stream coming from the phase separator 400 is supplied to the separation columns 500 to separate the carbon dioxide 9 and the epoxide compound 10, and to recycle them.

The configuration of the separation column 500 is specifically shown in FIG. 6. The separation column 500 includes a solvent surge drum 510, a chilling/recovering unit 501 consisting of a stabilizer 520, and a separation unit 530. The separation column 500 receives the top stream 8 that is recovered from the low-pressure separator 420 and the intermediate separator 410 and transfers them to the chilling/recovering unit 501 to separate the unreacted carbon dioxide 9 and the epoxide compound 512, and then supplies the solvent epoxide compound 512 to the separation unit 530 in order to remove by-product to the bottom, and recover the epoxide compound 10 to the top to reuse as the raw material.

The top stream 8 that is recovered from the intermediate pressure separator 410 and the low-pressure separator 420 is supplied to the solvent surge drum 510 operated at 0~100° C. and 0~1 kg/cm$^2$g, more preferably 0.48 kg/cm$^2$g. The solvent epoxide compound 511 in the solvent surge drum 510 is transferred into the stabilizer 520 through the solvent pump.

The stabilizer 520 is a kind of a stripper, which is separating the unreacted carbon dioxide from epoxide compound 511. The stabilizer 520 is operated at 10~60° C. and of 1~5 kg/cm$^2$g, more preferably 2~3 kg/cm$^2$g. The bottom stream 512 is chilled up to 30~50° C., more preferably 40~45° C. with cooling water, and then is transferred into the separation unit 530.

The carbon dioxide separated from the solvent surge drum 510 and the stabilizer 520 is recycled in order to reuse as the raw material.

In finishing column 530, grease and cyclic carbonate produced by side reaction are separated into the bottom stream 11. The solvent epoxide compound 10 that is recovered from the top is recycled in order to reuse as the raw material. At this time, the recycle solvent epoxide compound is preferably supplied through the epoxide compound purifier.

Advantageous Effects

The process according to the present invention can continuously manufacture an aliphatic polycarbonate, and an unreacted epoxide compound and carbon dioxide can be recycled to reuse as a raw material, thereby being economical.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
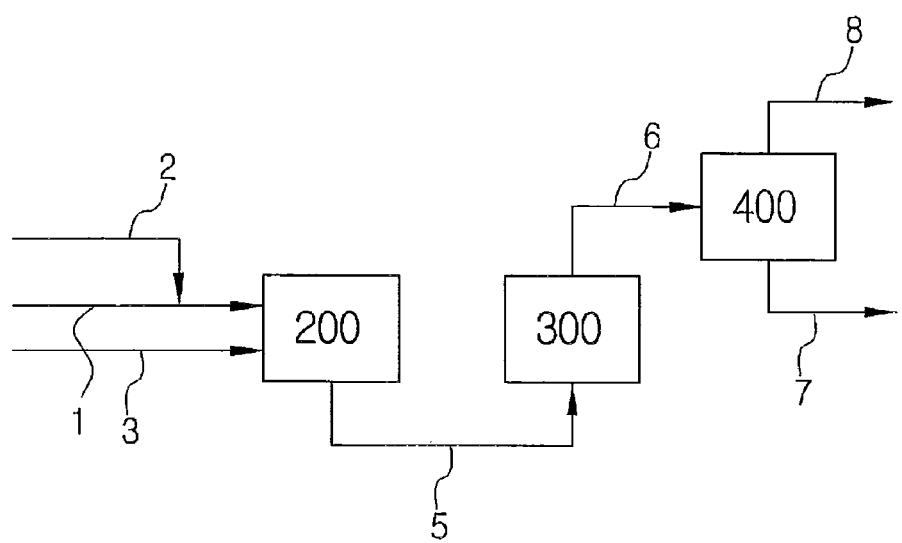
FIG. 1 is a schematic diagram of the process illustrating a process for manufacturing an aliphatic polycarbonate according to the present invention.
Figure 2:
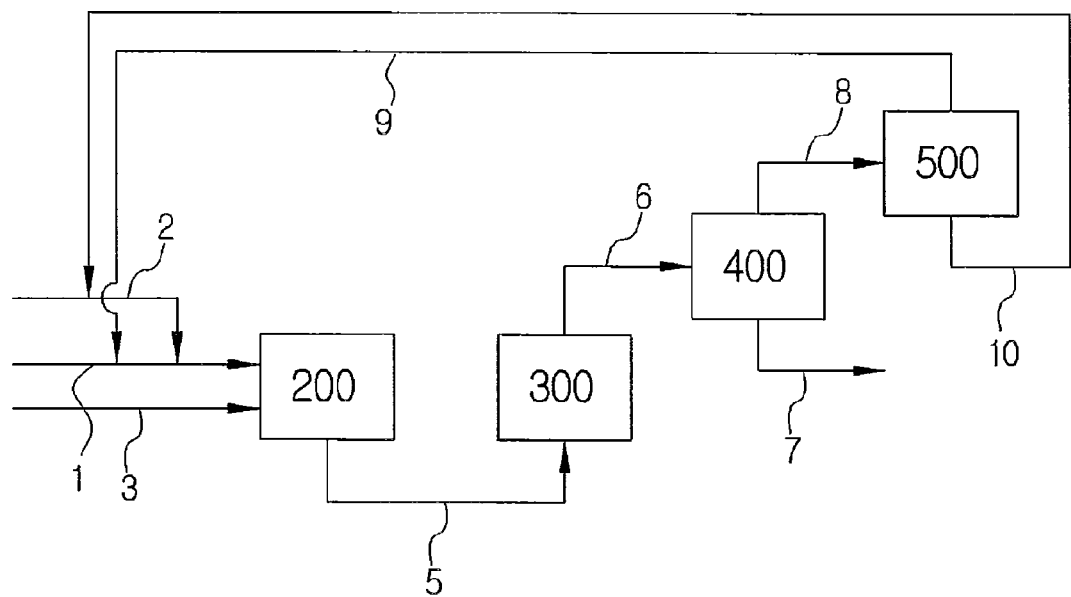
FIG. 2 is another schematic diagram of the process illustrating a process for manufacturing an aliphatic polycarbonate according to the present invention.
Figure 3:
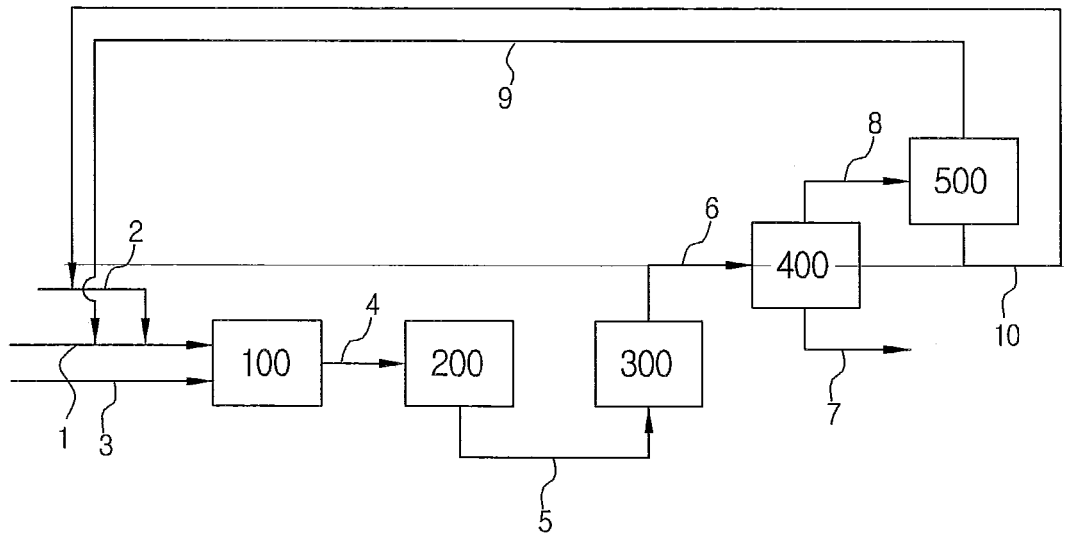
FIG. 3 is another schematic diagram of the process illustrating a process for manufacturing an aliphatic polycarbonate according to the present invention.
Figure 4:
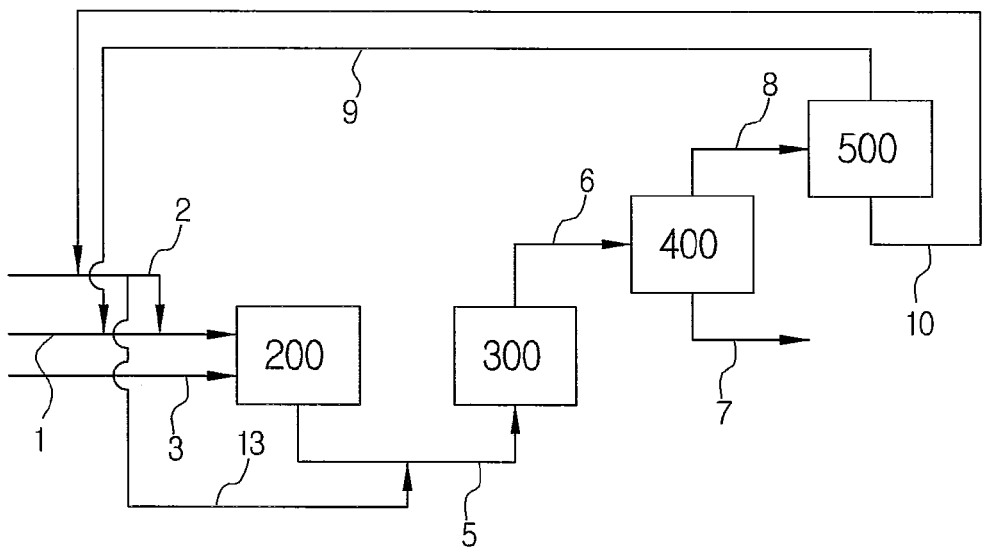
FIG. 4 is another schematic diagram of the process illustrating a process for manufacturing an aliphatic polycarbonate according to the present invention.
Figure 5:
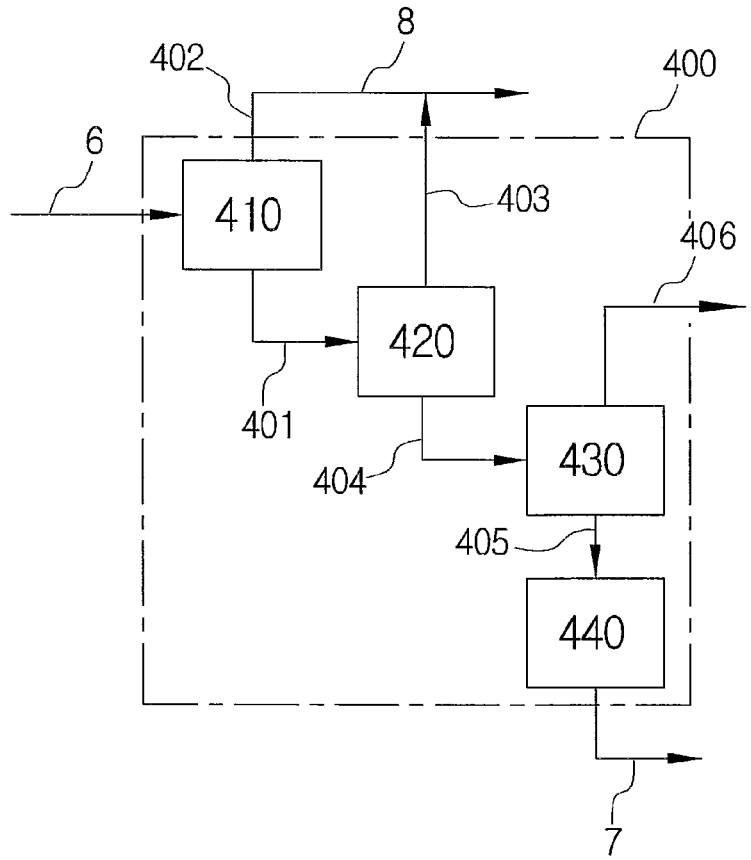
FIG. 5 is a schematic diagram of the process illustrating a solvent separator according to the present invention.
Figure 6:
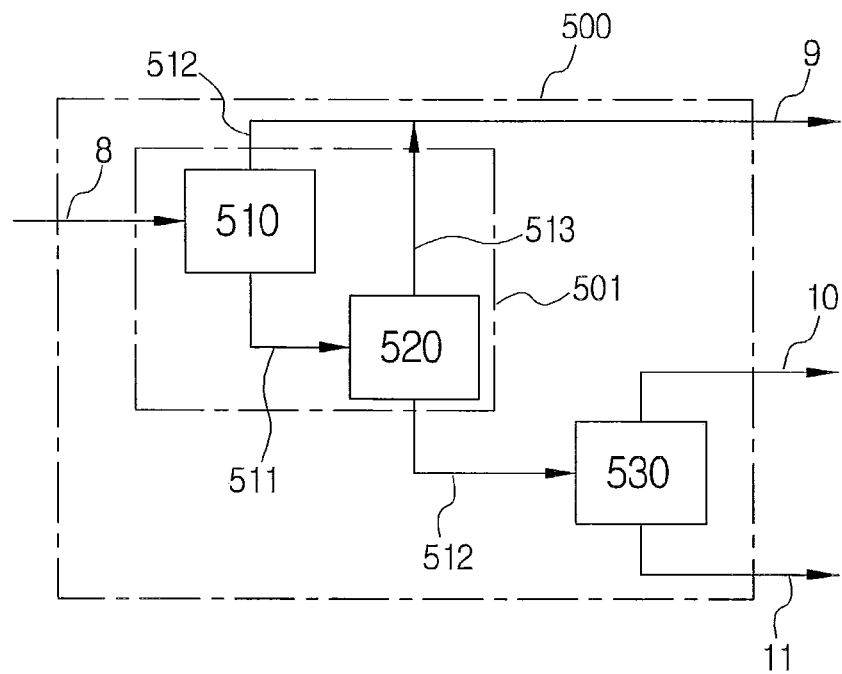
FIG. 6 is a schematic diagram of the process illustrating a chilling/recovering unit according to the present invention.

1: CARBON DIOXIDE
2: EPOXIDE COMPOUND
3: CATALYST
4: PREPOLYMERIZAION SOLUTION
5: POLYMER SOLUTION
6: POLYMER SOLUTION OF WHICH CATALYST IS REMOVED
7: POLYMER MELT
100: PREPOLYMER REACTOR
200: POLYMER REACTOR
300: CATALYST SEPARATOR
400: PHASE SEPARATOR
500: SEPARATION COLUMN

BEST MODE

Hereinafter, the present invention will be described in more detail with reference to the following Examples, but the scope of the present invention is not limited thereto.

Example 1 and Example 2

For example 1, carbon dioxide and propylene oxide were used as raw material. Aliphatic polycarbonate was continuously manufactured at 5 kg/hr by injecting catalyst represented by the following Chemical Formula 2 as the mole ratio of the propylene oxide:the catalyst=50,000:1.

[Chemical Formula 2]

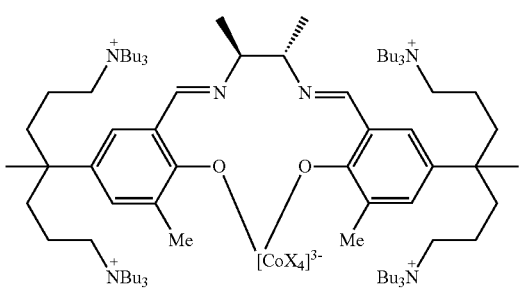

X = 2,4-dinitrophenolate

CSTR of 50-liter volume was used as a reactor, and the residence time in the reactor was adjusted to be 2 hrs. Carbon dioxide was injected with a certain flow rate to fully dissolve into propylene oxide.

At this time, the total flow rate of the raw materials to the reactor was 19.2 kg/hr, and was consisted of the carbon dioxide of 4.9 kg/hr and the propylene oxide of 14.3 kg/hr. The catalyst was dissolved in the propylene oxide with the weight ratio of catalyst:propylene oxide=1:10, and the injection rate of the catalyst was 11.2 g/hr.

The raw materials and the catalyst in the reactor were supplied to the top of the polymerization reactor and operated in full-liquid state and down-flow direction. The operating pressure was 40 kg/cm²g, and the reaction temperature was 75° C., and there is no temperature profile in the reactor as the polymerization proceeded. In order to maintain the reaction temperature, an electric tracing was used from the end part of a heater to the end part of the reactor. Pressure drop was measured across the reactor. The operating pressure in the reactor was controlled by a pressure control valve at the front of the intermediate pressure separator (IPS). The reaction conditions were listed in Table 2. After 2 hours of the residence time, propylene oxide was further added with 20 kg/hr to the polymer solution to secure flowability, and the diluted solution passed through the catalyst separator to remove catalyst.

Next, under the following conditions listed in Table 2, stranded polymer was obtained through the intermediate pressure separator (IPS), the low-pressure separator (LPS), and the vacuum stripper (VS). Epoxide compound was completely removed in polymer melt and 5 kg/hr of aliphatic polycarbonate was manufactured in continuous mode in pellet type through pelletizer.

At this time, the yielded polymer has molecular weight of 230,000 g/mole and glass transition temperature ($T_g$) of 38° C.

At this time, the top stream that is separated from the intermediate pressure separator (IPS) and the low-pressure separator (LPS) was transferred into the separation column to separate carbon dioxide and epoxide compound into the top of the stabilizer for reuse. The added amount of propylene oxide was 4.2 kg/hr in order to compensate the loss amount that is used for the reaction or lost as off-gas.

For Example 2, the aliphatic polycarbonate was continuously manufactured at 2.5 kg/hr by injecting the catalyst as the mole ratio of propylene oxide catalyst=100,000:1. The process was similar to Example 1 Except the catalyst injection rate in Example 2 was lower than Example 1. Even if decreasing the injection amount of the catalyst, the molecular weight of the polymer was 220,000 g/mole and the glass transition temperature was 38° C., which is similar to Example 1. Decreasing catalyst injection rate is more economical because the similar quality of polymer can be obtained with lower catalyst cost.

The material balances of Example 1 and 2 were shown in the following Table 1.

TABLE 1

| | Material Balance | | | |
|---|---|---|---|---|
| | Example 1 | | Example 2 | |
| | Flow Rate Kg/h | Composition Wt % | Flow Rate Kg/h | Composition Wt % |
| Feed | | | | |
| $CO_2$ | 4.90 | 53.1 | 4.90 | 59.2 |

TABLE 1-continued

Material Balance

| | Example 1 | | Example 2 | |
|---|---|---|---|---|
| | Flow Rate Kg/h | Composition Wt % | Flow Rate Kg/h | Composition Wt % |
| Net Make-up PO | 4.21 | 45.6 | 3.32 | 40.1 |
| Catalyst solution | 0.11 | 1.2 | 0.06 | 0.7 |
| Total Product | 9.22 | 100.0 | 8.28 | 100.0 |
| Off-gas | 4.12 | 44.7 | 5.70 | 68.8 |
| Heavy impurities | 0.16 | 1.7 | 0.06 | 30.5 |
| Polymer | 4.94 | 53.6 | 2.52 | 0.7 |
| Total | 9.22 | 100.0 | 8.28 | 100.0 |

TABLE 2

Process conditions

| | | Example 1 | Example 2 |
|---|---|---|---|
| Injection Amount of Raw Material | | | |
| $CO_2$ | Kg/hr | 4.90 | 4.90 |
| Make-up PO | Kg/hr | 4.21 | 3.32 |
| Recycle PO | Kg/hr | 30.00 | 12.01 |
| Reaction conditions | | | |
| Raw Material of Reactor | Kg/hr | 19.24 | 19.24 |
| Temperature of Reactor | °C. | 75 | 75 |
| Pressure of Reactor | kg/cm²g | 40 | 40 |
| Residence time of Reactor | Hrs | 2.0 | 2.0 |
| PO to Catalyst Ratio | Mol/mol | 50,000 | 100,000 |
| Phase separation conditions | | | |
| IPS Temperature | °C. | 75 | 75 |
| IPS Pressure | kg/cm²g | 3.0 | 3.0 |
| LPS Temperature | °C. | 120 | 120 |
| LPS Pressure | kg/cm²g | 1.0 | 1.0 |
| VS Temperature | °C. | 150 | 150 |
| VS Pressure | kg/cm²g | −0.98 | −0.98 |
| Polymer yield | Kg/hr | 4.94 | 2.52 |

The invention claimed is:

1. A continuous process for manufacturing aliphatic polycarbonate, comprising:
   a) continuously polymerizing by supplying carbon dioxide, one or more epoxide compounds, and organometallic catalyst to a polymerization reactor;
   b) supplying polymer solution which is polymerized in step a) to a catalyst separator for catalyst adsorption;
   c) supplying polymer solution from which catalyst is removed in step b) to several phase separators to separate unreacted epoxide compound and carbon dioxide into a top stream and yield polymer melt; and
   d) supplying the top stream from the phase separators to a distillation column to separate carbon dioxide and epoxide compound and then reusing them as raw materials in step a).

2. The process for continuously manufacturing aliphatic polycarbonate of claim 1, wherein the epoxide compound is a reactant and a reaction solvent as well.

3. The process for continuously manufacturing aliphatic polycarbonate of claim 2, wherein a polar solvent as the reaction solvent is further included in addition to the epoxide compound.

4. The process for continuously manufacturing aliphatic polycarbonate of claim 1, wherein an ion exchange process is used for separating the catalyst.

5. The process for continuously manufacturing aliphatic polycarbonate of claim 1, wherein, after prepolymerization is performed by continuously supplying carbon dioxide, one or more epoxide compounds, and catalyst to a prepolymerization reactor, aliphatic polycarbonate is continuously manufactured by continuously supplying the prepolymerized solution into the polymerization reactor.

6. The process for continuously manufacturing aliphatic polycarbonate of claim 5, wherein prepolymerization is performed at 10-49 kg/cm²g and 0-100° C. and polymerization is performed at 10-49 kg/cm²g and 40-100° C.

7. The process for continuously manufacturing aliphatic polycarbonate of claim 1, wherein a part of the epoxide compound is supplied to the polymerization reactor outlet to adjust 5-30 wt % of the concentration of the polymer solution.

8. The process for continuously manufacturing aliphatic polycarbonate of claim 1, wherein the unreacted carbon dioxide and epoxide compound are separated from the polymer in several phase separators to separate the unreacted epoxide compound and carbon dioxide into vapor phase, and concentrate aliphatic polycarbonate into polymer melt.

9. The process for continuously manufacturing aliphatic polycarbonate of claim 1, wherein the reusing of step d) is performed by supplying the separated unreacted carbon dioxide and epoxide compound to a separation column to separate the carbon dioxide and epoxide compound respectively and then reuse them as the raw material.

10. The process for continuously manufacturing aliphatic polycarbonate of claim 8, wherein separation of the unreacted carbon dioxide and epoxide compound includes a low-pressure separation performed at 0-5 kg/cm²g and 40-200° C. after an intermediate pressure separation performed at 0-10 kg/cm²g and 40-200° C.

11. The process for continuously manufacturing aliphatic polycarbonate of claim 1, wherein the epoxide compound is one or more from the group consisting of substituted or unsubstituted ($C_2$-$C_{10}$) alkylene oxide with a halogen or an alkoxy; substituted or unsubstituted ($C_4$-$C_{20}$)cycloalkylene oxide with a halogen or an alkoxy; and substituted or unsubstituted ($C_8$-$C_{20}$)styrene oxide with a halogen, an alkoxy, an alkyl, or an aryl.

12. The process for continuously manufacturing aliphatic polycarbonate of claim 1, wherein carbon dioxide and epoxide compound are mixed and maintained in full liquid phase, to supply to the prepolymerization reactor or the polymerization reactor.

13. The process for continuously manufacturing aliphatic polycarbonate of claim 1, wherein the organometallic catalyst is a complex compound represented by the following Chemical Formula 1:

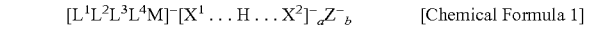
[Chemical Formula 1]

where,

M is a cobalt III or a chrome III;

$L^1$ to $L^4$ is an anionic X-type ligand, $L^1$ to $L^4$ may be independently same or different to each other, and may be connected each other to be a bidentate, a tridentate, or a tetradentate ligand, one or more of $L^1$ to $L^4$ include a quaternary ammonium cation, the total number of ammonium cations included in $L^1$ to $L^4$ is 1+a+b, and a complex compound is overall neutral;

a or b is an integer; and

Ligand without the ligand including the quaternary ammonium cation of $L^1$ to $L^4$, or $X^1$ and $X^2$ are independently a halogen anion or $HCO_3^-$, $C_1$ to $C_{20}$ carboxy anion, C6 to C20 aryloxy anion with or without one or more of a halogen atom, a nitrogen atom, an oxygen atom, a silicon atom, a sulfur atom, and a phosphorus atom; $C_1$ to $C_{20}$ alkoxy anion; $C_1$ to $C_{20}$ carbonate anion; $C_1$ to $C_{20}$ alkylsulfonate anion; $C_1$ to $C_{20}$ amide anion; $C_1$ to $C_{20}$ carbamate anion, and Z is $BF_4^-$, $ClO_4^-$, $NO_3^-$ or $PF_6^-$.

14. The process for continuously manufacturing aliphatic polycarbonate of claim 1, wherein the organometallic catalyst is selected from the group consisting of the following Chemical Formula 2 to Chemical Formula 8:

[Chemical Formula 2]

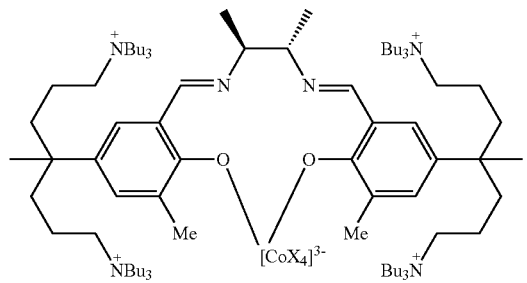

X = 2,4-dinitrophenolate

[Chemical Formula 3]

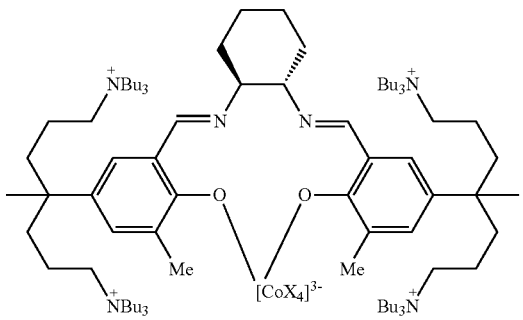

[Chemical Formula 4]

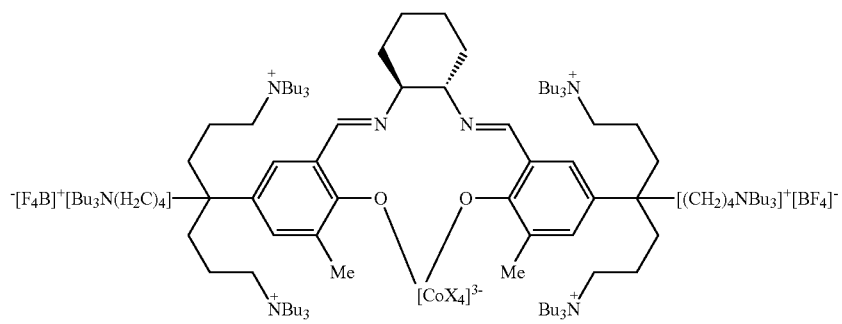

X = 2,4-dinitrophenolate

[Chemical Formula 5]

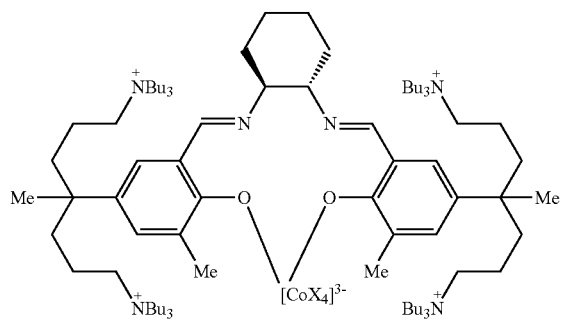

X = 2,4-dinitrophenolate

[Chemical Formula 6]

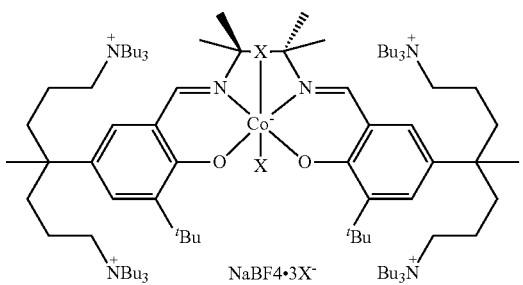

[Chemical Formula 7]

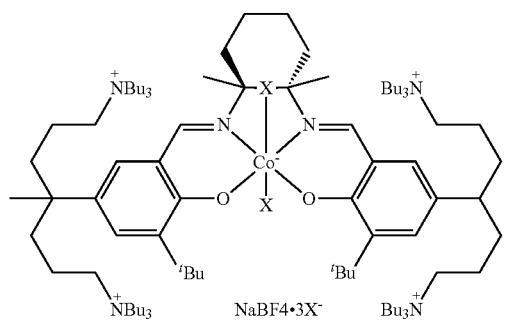

X = 2,4-dinitrophenolate

[Chemical Formula 8]

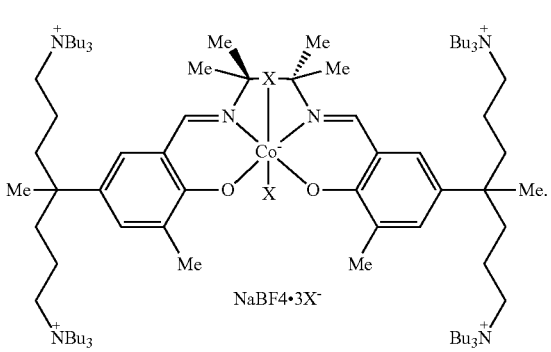

15. The process for continuously manufacturing aliphatic polycarbonate of claim 1, wherein the organometallic catalyst is maintained in liquid phase after mixing with the mole ratio of the epoxide compound or other polar solvents:the organometallic catalyst of 10,000:1 to 200,000:1.

16. The continuous process for manufacturing aliphatic polycarbonate of claim 15, wherein the organometallic catalyst solution is 0.1-5 wt % to the total content of the epoxide compound and carbon dioxide.

17. The process for continuously manufacturing aliphatic polycarbonate of claim 1, wherein the several phase separators include an intermediate pressure separator, a low-pressure separator and a vacuum stripper,
    wherein the intermediate pressure separator is operated at 0-10 kg/cm$^2$g, and 40-200° C., the low pressure separator is operated at 0-5 kg/cm$^2$g, and 40-200° C., the vacuum stripper is maintained at 5-100 ton by using a vacuum pump.

* * * * *

UNITED STATES PATENT AND TRADEMARK OFFICE
CERTIFICATE OF CORRECTION

PATENT NO.        : 8,546,514 B2                                      Page 1 of 1
APPLICATION NO.   : 12/874507
DATED             : October 1, 2013
INVENTOR(S)       : Byoungmu Chang et al.

It is certified that error appears in the above-identified patent and that said Letters Patent is hereby corrected as shown below:

In the Claims

Column 16, Line 1, Claim 14, below

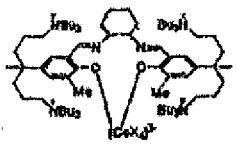

" insert -- X=2,4- dinitrophenolate --

Column 16, Line 1, Claim 14, below

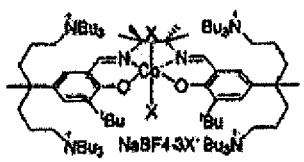

" insert -- X=2,4- dinitrophenolate --

Column 16, Line 1, Claim 14, below

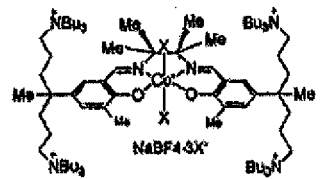

" insert -- X=2,4- dinitrophenolate --

Column 17, Line 16, Claim 17, delete "ton" and insert -- torr --

Signed and Sealed this
Eighteenth Day of February, 2014

Michelle K. Lee
*Deputy Director of the United States Patent and Trademark Office*